United States Patent
Matsuno et al.

(10) Patent No.: US 8,711,483 B2
(45) Date of Patent: Apr. 29, 2014

(54) LENS MODULE AND METHOD FOR MANUFACTURING THEREOF

(71) Applicant: FUJIFILM Corporation, Tokyo (JP)

(72) Inventors: Ryo Matsuno, Saitama (JP); Satoshi Yoneyama, Saitama (JP); Takashi Koike, Saitama (JP); Kazuhide Hasegawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/013,659

(22) Filed: Aug. 29, 2013

(65) Prior Publication Data

US 2013/0342924 A1 Dec. 26, 2013

Related U.S. Application Data (63) Continuation of application No. PCT/JP2012/054692, filed on Feb. 27, 2012.

(30) Foreign Application Priority Data

Mar. 1, 2011 (JP) ................................. 2011-044549

(51) Int. Cl.
G02B 27/10 (2006.01)

(52) U.S. Cl.
USPC ......................................... 359/620; 359/622

(58) Field of Classification Search
USPC ......................................... 359/618–626, 642
See application file for complete search history.

(56) References Cited

U.S. PATENT DOCUMENTS

| | | | |
|---|---|---|---|
| 8,542,309 B2 * | 9/2013 | Yamada et al. | 359/619 |
| 2010/0284089 A1 * | 11/2010 | Shyu et al. | 359/622 |

FOREIGN PATENT DOCUMENTS

| | | |
|---|---|---|
| JP | 2009-086092 | 4/2009 |
| JP | 2009-251249 | 10/2009 |
| JP | 2010-204632 | 9/2010 |
| JP | 2010-256563 | 11/2010 |

OTHER PUBLICATIONS

International Search Report, PCT/JP2012/054692, May 22, 2012.
Written Opinion of the International Searching Authority, May 22, 2012.

* cited by examiner

*Primary Examiner* — Alicia M Harrington
(74) *Attorney, Agent, or Firm* — Young & Thompson (57) ABSTRACT

A lens module capable of preventing a deterioration of optical properties and a method for manufacturing thereof are provided. Optical axes of lens portions of superimposed lens arrays are aligned. Substrate portions of the other lens arrays of the superimposed lens arrays except the lowermost lens array are cut by a first cutting portion. Subsequently, thermosetting resins are supplied from a gap between cut surfaces of the cut substrate portion so as to fill a gap between the substrate portions of the superimposed lens arrays with the thermosetting resins and to cause the thermosetting resins to integrally cover the cut surfaces of the substrate portion and a surface of the substrate portion of the uppermost lens array. Thereafter, the thermosetting resins are cured, and an individual lens module is separated by cutting the substrate portion of the lowermost lens array using a second cutting portion.

20 Claims, 8 Drawing Sheets

LENS MODULE AND METHOD FOR MANUFACTURING THEREOF

CROSS REFERENCE TO RELATED APPLICATIONS

This application is a continuation of PCT/JP2012/054692 filed on Feb. 27, 2012, which claims foreign priority to Japanese Application No. 2011-044549 filed on Mar. 1, 2011. The entire contents of each of the above applications are hereby incorporated by reference.

BACKGROUND OF THE INVENTION

1. Field of the Invention

The present invention relates to a lens module and a method for manufacturing thereof.

2. Description of the Related Art

In recent years, a compact and thin type imaging unit has been installed in a portable terminal such as a mobile telephone or a personal digital assistant (PDA). In general, such an imaging unit includes a solid-state imaging device, such as a charge coupled device (CCD) image sensor or a complementary metal-oxide semiconductor (CMOS) image sensor, and a lens to form a subject image on the solid-state imaging device.

To reduce the cost of an imaging unit, there is a demand for streamlining a method for manufacturing a lens so as to enable the lens, which is to be mounted on the imaging unit, to be manufactured at low cost and in large amounts. Such a lens is produced in accordance with the following procedure. First, a lens array having a configuration in which a plurality of lens portions are integrally formed on a substrate portion is manufactured, and then the plurality of lens portions are respectively separated by cutting the substrate portion. Subsequently, the lens is mounted on the imaging unit.

A method for manufacturing a lens module has been disclosed in JP2009-251249A. In the method, the lens module is manufactured by bonding a wafer level lens array, in which a substrate portion and a plurality of lens portions are integrally formed, to another wafer level lens array using an adhesive.

The substrate portion is cut into the lens module of which the lenses are bonded to each other, and then the lens module is mounted on an imaging unit. The imaging unit is mounted on a circuit substrate, such as a portable terminal, by a reflow mounting method.

SUMMARY OF THE INVENTION

However, in the case of an adhering process using an adhesive as described in JP2009-251249A mentioned above, optical properties of a lens module are deteriorated due to a gap between the substrate portions of the lens module or a positional deviation of an optical axis of a lens portion thereof, during a reflow process after mounting the lens module on the imaging unit.

The present invention has been made in consideration of the circumstances mentioned above. The present invention provides a lens module capable of preventing a deterioration of optical properties and a method for manufacturing thereof.

(1) There is provided a method for manufacturing a lens module in which a plurality of lenses are held in a state where an optical axis of each lens is aligned. According to the method, a plurality of lens arrays, each of which has a plurality of lens portions and a substrate portion integrally connecting the plurality of lens portions, are superimposed on each other at predetermined intervals. Then, optical axes of the lens portions of superimposed lens arrays are aligned. The substrate portions of the other lens arrays of the plurality of superimposed lens arrays except the lowermost lens array in a superimposing direction are cut by a first cutting portion. Subsequently, thermosetting resins are supplied from a gap between cut surfaces of the cut substrate portion so as to fill a gap between the substrate portions of the superimposed lens arrays with the thermosetting resins and to cause the thermosetting resins to integrally cover the cut surfaces of the substrate portion and a surface of the substrate portion of the uppermost lens array in the superimposing direction of the plurality of superimposed lens arrays. Thereafter, the thermosetting resins are cured by supplying heat, and an individual lens module is separated by cutting the substrate portion of the lowermost lens array in the superimposing direction of the plurality of superimposed lens arrays using a second cutting portion.

(2) A lens module which is manufactured by the method for manufacturing a lens module according to (1). In this case, the uppermost lens array in the superimposing direction is the topmost lens array in a direction opposite to a gravity acting direction of the superimposing direction. The lowermost lens array in the superimposing direction is the bottommost lens array in a direction parallel to a gravity acting direction of the superimposing direction. In addition, the surfaces of the substrate portion of the lens array are two surfaces which are formed on the lens array and substantially perpendicular to the optical axes of the plurality of lens portions.

According to the present invention, it is possible to provide a lens module capable of preventing a deterioration of optical properties and a method for manufacturing thereof.

DESCRIPTION OF THE PREFERRED EMBODIMENTS

Figure 1:
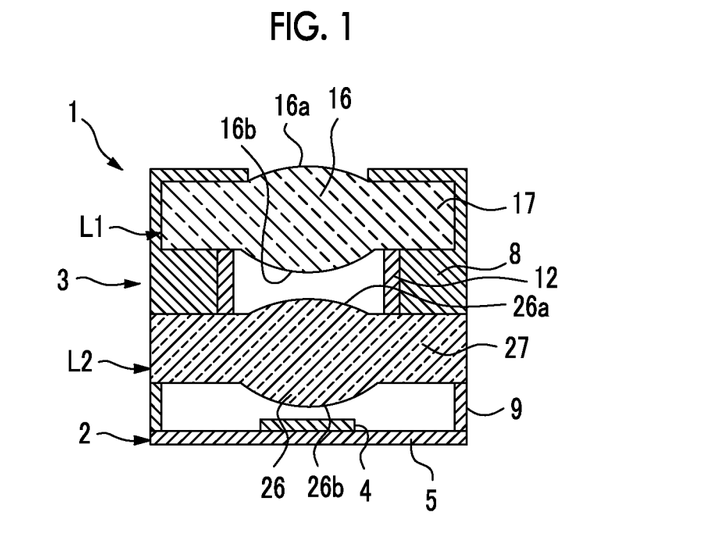
FIG. 1 is a cross-sectional view which shows an example of an imaging unit for describing an embodiment of the present invention.

An imaging unit 1 shown in FIG. 1 has a sensor module 2 and a lens module 3.

The sensor module 2 includes a solid-state imaging device 4 and a sensor substrate portion 5. The sensor substrate portion 5 is formed of a semiconductor material, such as silicon. The solid-state imaging device 4 is a CCD image sensor or a CMOS image sensor, for example. The solid-state imaging device 4 is formed by repeatedly performing a known deposition process, a photolithography process, an etching process, an impurity addition process and the like so as to form a light receiving region, an insulating film, an electrode, wiring and the like on the sensor substrate portion 5.

The lens module 3 includes a first lens L1 and a second lens L2.

The first lens L1 includes a lens portion 16 and a flange portion 17. Predetermined lens surfaces 16a and 16b are respectively formed on front and rear sides of the lens portion 16. Both lens surfaces 16a and 16b respectively have a spherical convex shape in the example shown in drawings. However, depending on the application, it is possible to adopt various combinations of a spherical convex shape, a spherical concave shape, an aspherical shape and a plane shape. The flange portion 17 is protruded from an outer periphery of the lens portion 16 and surrounds the outer periphery of the lens portion 16. The lens portion 16 and the flange portion 17 are integrally formed by a translucent material.

The second lens L2 has the same configuration as that of the first lens L1. In other words, the second lens L2 includes a lens portion 26 and a flange portion 27. Predetermined lens surfaces 26a and 26b are respectively formed on front and rear sides of the lens portion 26. Both lens surfaces 26a and 26b respectively have a spherical convex shape in the example shown in drawings. However, depending on the application, it is possible to adopt various combinations of a spherical convex shape, a spherical concave shape, an aspherical shape and a plane shape. The flange portion 27 is protruded from an outer periphery of the lens portion 26 and surrounds the outer periphery of the lens portion 26. The lens portion 26 and the flange portion 27 are integrally formed by a translucent material.

An adhering portion 12 is provided between the first lens L1 and the second lens L2 in order to relatively fix the positions of both lenses. The adhering portion 12 surrounds peripheries of the lens surface 16b of the lens portion 16 and the lens surface 26a of the lens portion 26. The adhering portion 12 is formed of ultraviolet curable resins, as described below.

In addition, the lens module 3 includes a holding portion 8.

The holding portion 8 covers a surface of the flange portion 17 of the first lens L1, and a part of the holding portion 8 is inserted in a gap between the flange portion 17 and the flange portion 27. The holding portion 8 is formed of materials having a light blocking effect. Thermosetting resins are adopted as the materials constituting the holding portion 8, as described below.

Figure 2:
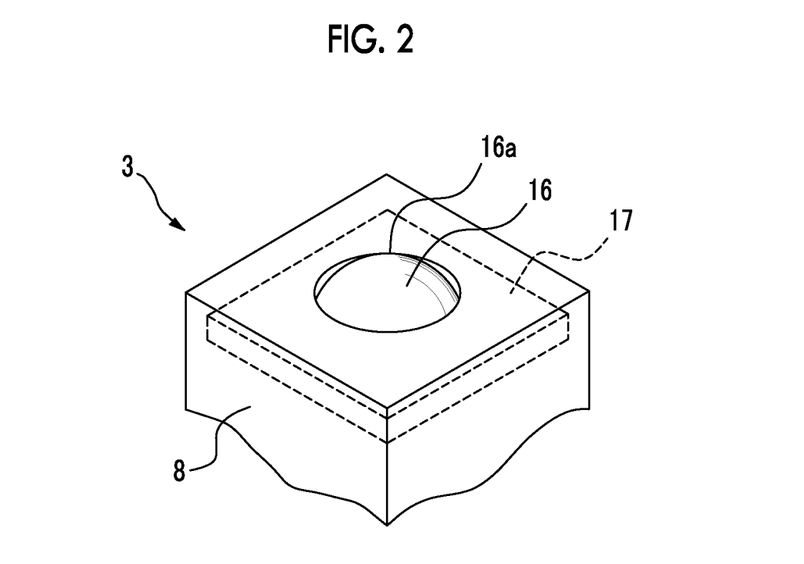
FIG. 2 is a perspective view showing a part of a lens module.

FIG. 2 is a perspective view showing a part of the lens module 3. The holding portion 8 has a rectangular shape. The holding portion 8 covers the flange portion 17 except the lens surface 16a, and therefore causing the lens surface 16a to be exposed to the external side through a substantially circular-shaped opening on an upper surface.

Furthermore, the holding portion 8 may be configured so as to cover an end surface of the flange portion 27 of the second lens L2.

In the lens module 3, the first lens L1 and the second lens L2 are superimposed on each other and held in a state in which optical axes of the lens portions 16 and 17 are aligned, as shown in FIG. 1.

The lens module 3 is laminated on the sensor module 2 via a spacer 9 between the flange portion 27 and the sensor substrate portion 5, and is assembled to the sensor module 2. The spacer 9 has a thickness for ensuring a predetermined distance between the sensor substrate portion 5 and the flange portion 27 so as to make light introduced by the lens portions 16 and 26 of the lens module 3 form an image on a light receiving surface of the solid-state imaging device 4. The spacer 9 and both modules 2 and 3 are adhered to each other by an adhesive, for example.

The shape of the spacer 9 is not particularly limited as long as it is possible to ensure a predetermined distance between the sensor substrate portion 5 of the sensor module 2 and the flange portion 27 of the lens module 3. However, it is preferable that the spacer 9 be a frame-shaped member which surrounds a periphery of the solid-state imaging device 4 so as to enable the space between both modules 2 and 3 to be completely separated from the external side. According to the configuration described above, it is possible to prevent foreign matter such as dust from being inserted through the space between both modules 2 and 3 so as not to adhere to the light receiving surface of the solid-state imaging device 4. Furthermore, if the spacer 9 is formed of materials having a light blocking effect, it is possible to block the unnecessary light incident from the space between both modules 2 and 3 onto the solid-state imaging device 4.

In addition, although the lens module 3 has the two lenses L1 and L2, the lens module 3 may have three or more lenses. Furthermore, a plurality of lenses of a lens module may have shapes different from one another.

The imaging unit 1 configured as described above is mounted on a circuit substrate, such as a portable terminal, by a reflow mounting method. In the circuit substrate, a paste solder is printed at the position where the imaging unit 1 is mounted, in advance. Then, the imaging unit 1 is placed at the position. Subsequently, the irradiation of infrared rays or the heating treatment, such as blowing hot air, is carried out with respect to the circuit substrate including the imaging unit 1. Thereby, the solder melts and the imaging unit 1 is mounted on the circuit substrate.

The lens module 3 described above is produced in accordance with the following procedure. First, a lens array in which a plurality of lens portions 16 are arranged one-dimensionally or two-dimensionally is brought to be superimposed on a lens array in which a plurality of lens portions 17 are arranged at the same positions as those of the lens portions 16. Next, the superimposed lens arrays are cut into a lens module. In addition, the sensor module 2 described above is also produced by the similar way. First, a sensor array in which a plurality of solid-state imaging devices are arranged one-dimensionally or two-dimensionally is cut into a sensor module such that each sensor module includes a solid-state imaging device. Hereinafter, the configuration of the lens array used for manufacturing the lens module 3 will be described.

Figure 3:
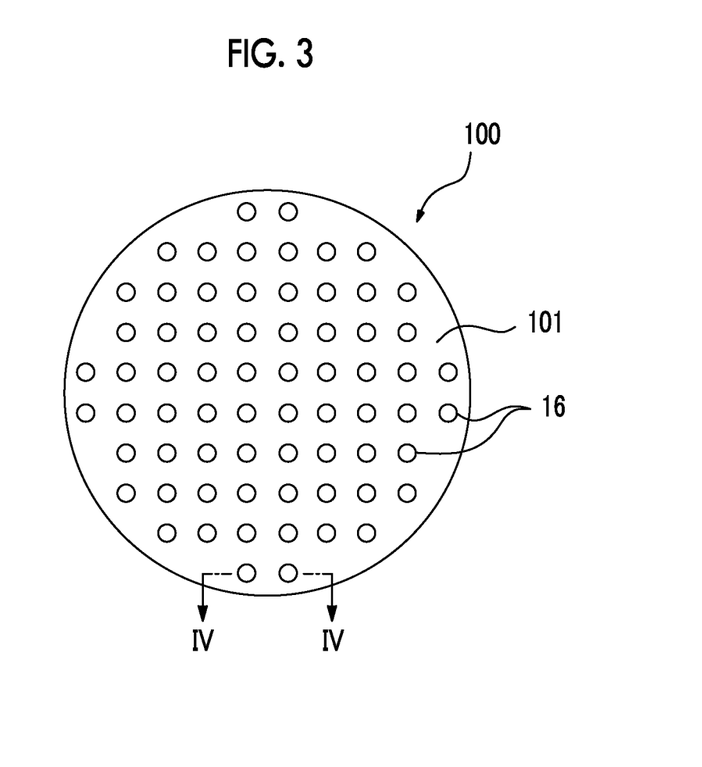
FIG. 3 is a view showing a lens array.
Figure 4:
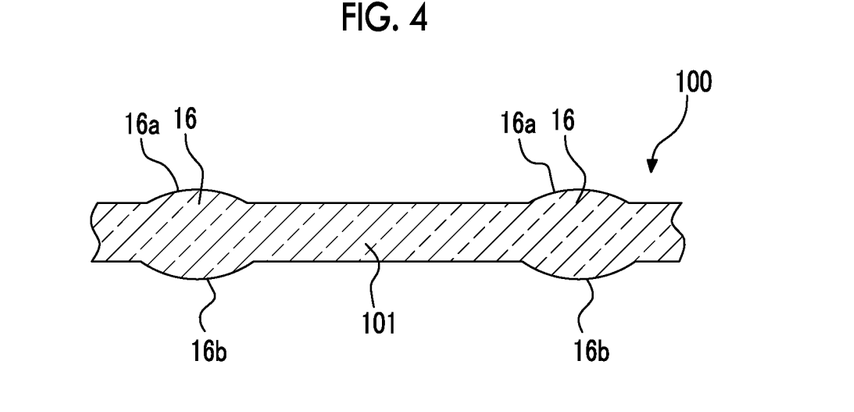
FIG. 4 is a cross-sectional view of the lens array in FIG. 3, taken along line IV-IV.

FIG. 3 is a plan view showing a lens array. FIG. 4 is a cross-sectional view of the lens array shown in FIG. 3, taken along line IV-IV. Although a lens array in which the lens portions 16 are arranged is exemplarily described in FIGS. 3 and 4, a lens array in which the lens portions 17 are arranged has the same configuration.

A lens array 100 includes the plurality of lens portions 16 and a substrate portion 101 connecting the lens portions 16 integrally. The whole lens array 100 has a wafer shape having a predetermined size in which the plurality of lens portions 16 are arranged two-dimensionally. The lens array 100 is referred to as a lens array of wafer level, as well. The lens portions 16 and the substrate portion 101 are integrally formed by a translucent material. In addition, the plurality of lens portions 16 may be arranged one-dimensionally, in the example shown in drawings.

The lens array 100 is produced by molding resins having an optical transparency using a molding die described below.

The lens module 3 (see FIG. 1) described above is produced in accordance with the following procedure. First, the lens array 100 is brought to be superimposed on a lens array in which the lens portions 17 are arranged. Subsequently, the substrate portion 101 is cut into a lens module 3 such that the lens portions 16 and the lens portions 17 are individually separated.

Next, the procedure of molding the lens array 100 shown in FIGS. 3 and 4 will be described.

Figure 5A:
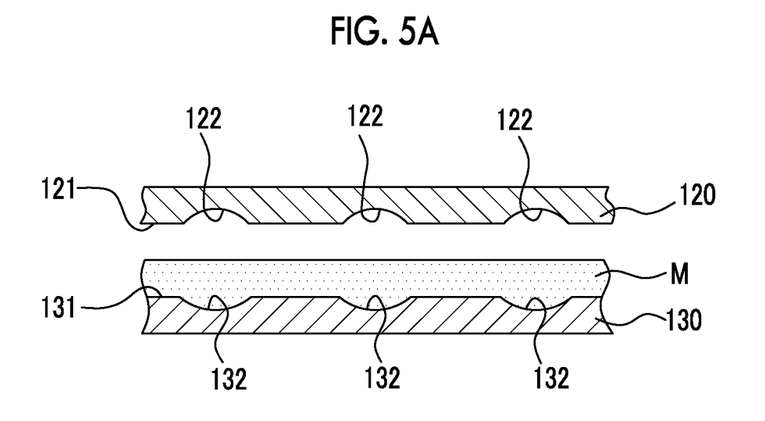
FIGS. 5A to 5C are schematic cross-sectional views which describe processes for molding the lens array.
Figure 5B:
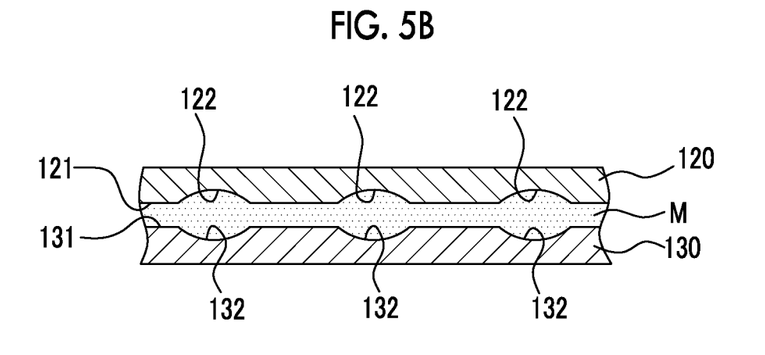
Figure 5C:
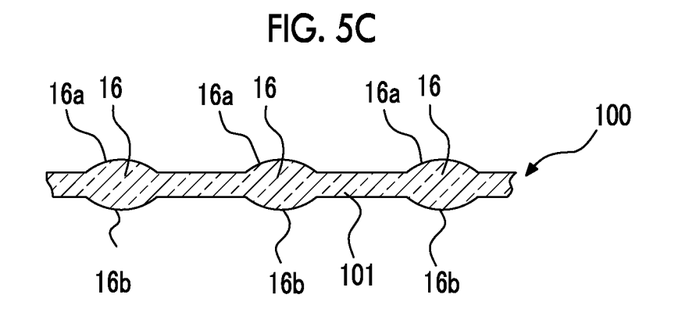

FIGS. 5A to 5C are schematic cross-sectional views which describe processes for molding the lens array 100. First, the configuration of the molding die will be described based on FIG. 5A.

The molding die includes a pair of upper and lower molds 120 and 130. The mold 120 has a transfer surface 121, and the mold 130 has a transfer surface 131. The mold 120 is used to mold a shape on one surface side of the lens array 100 by the transfer surface 121. The mold 130 is used to mold a shape on the other surface side of the lens array 100.

The transfer surface 121 has an inverted shape of one surface of the lens array 100. The transfer surface 131 has an inverted shape of the other surface of the lens array 100.

Lens molding surfaces 122 are two-dimensionally arranged on the transfer surface 121 of the mold 120 so as to correspond to the arrangement of the lens portions 16 of the lens array 100. The lens molding surface 122 is molded in a spherical concave shape so as to correspond to the lens surface 16a having a spherical convex shape.

Lens molding surfaces 132 are two-dimensionally arranged on the transfer surface 131 of the mold 130 so as to correspond to the arrangement of the lens portions 16 of the lens array 100. The lens molding surface 132 is molded in a spherical concave shape so as to correspond to the lens surface 16b having a spherical convex shape.

Next, the procedure of the manufacturing method using the molding die described above will be described.

First, resins M which are materials constituting the lens array 100 are supplied to the transfer surface 131 of the mold 130, as shown in FIG. 5A. The resins M are controllably supplied using a feeding device, such as a dispenser (not shown).

An energy-curable resin composition is adopted as the resins M. The energy-curable resin composition may be a resin composition cured by heat or a resin composition cured by the irradiation (the irradiation of ultraviolet rays or electron beams) of active energy rays.

As shown in FIG. 5B, the resins M are interposed between the molds 120 and 130, and therefore the resins M are deformed in the shapes of the transfer surfaces 121 and 131. Next, the resins M interposed between the molds 120 and 130 are cured.

After curing the resins, the lens array 100 which is constituted by the cured resins M is separated from the molds 120 and 130, as shown in FIG. 5C. In this way, it is possible to produce the lens array 100. Also, it is possible to produce a lens array 200 in accordance with the similar procedure.

Next, the procedure of manufacturing the lens module described above will be described based on FIGS. 6 to 7C.

Figure 6:
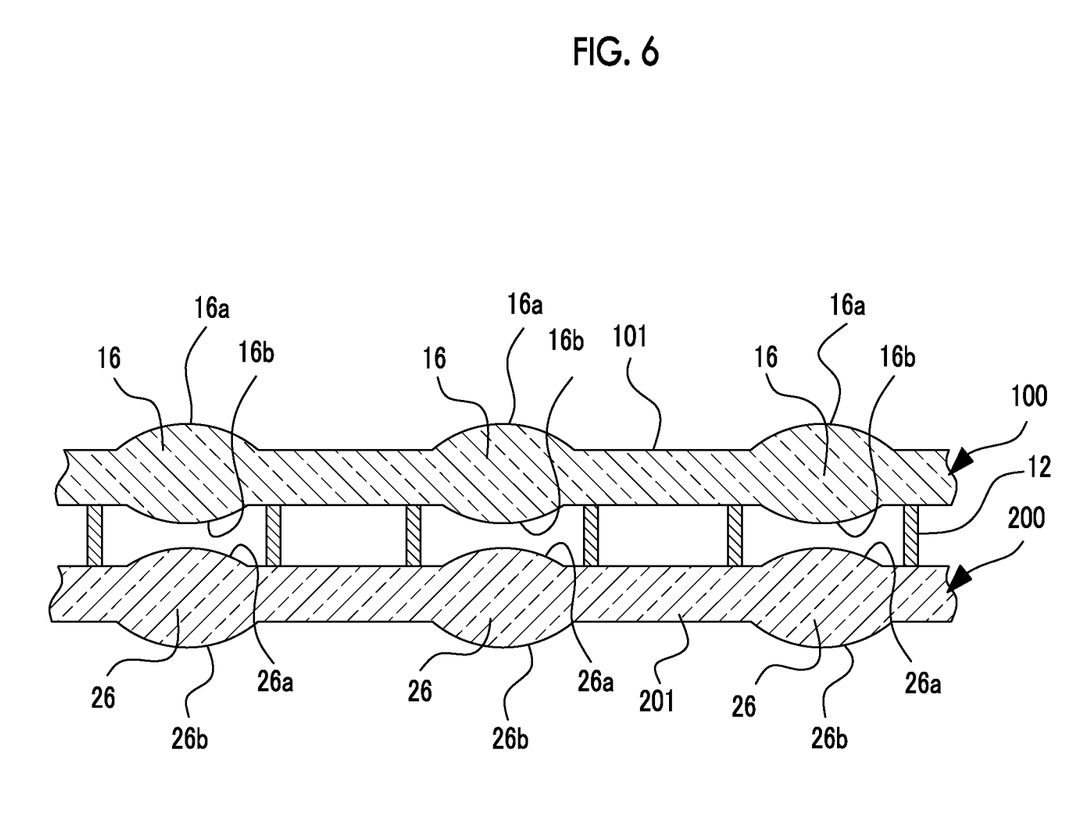
FIG. 6 is a schematic cross-sectional view showing a state in which two lens arrays are superimposed on each other.

The lens array 100 in which the plurality of lens portions 16 are arranged is brought to be superimposed on the lens array 200 in which the plurality of lens portions 17 are arranged, as shown in FIG. 6. The lens array 100 and the lens array 200 are adhered to each other by the adhering portion 12.

The adhering portion 12 is formed of ultraviolet curable resins. The adhering portion 12 causes the substrate portion 101 and the substrate portion 201 to be adhered to each other.

In addition, the adhering portion 12 is formed so as to surround the peripheries of the lens surface 16b and the lens surface 26a. Further, the adhering portion 12 causes the lens portion to be partitioned from the thermosetting resins to be supplied, as described below.

The adhering portion 12 is formed in accordance with the following procedure. First, ultraviolet curable resins are deposited on a predetermined portion on the lens array 200, and then the lens array 100 is brought to be superimposed on the lens array 200. Next, the ultraviolet curable resins are cured by the irradiation of ultraviolet rays.

In the present invention, the superimposed lens arrays 100 and 200 are fixed at the positions in which optical axes of the lens portion 16 and the lens portion 26 are aligned, by causing the lens arrays to be adhered to each other by the adhering portion 12. In this way, the superimposed lens arrays 100 and 200 constitute a lens-array laminated body.

Next, the procedure of manufacturing a lens module from a lens-array laminated body described above will be described.

Figure 7A:
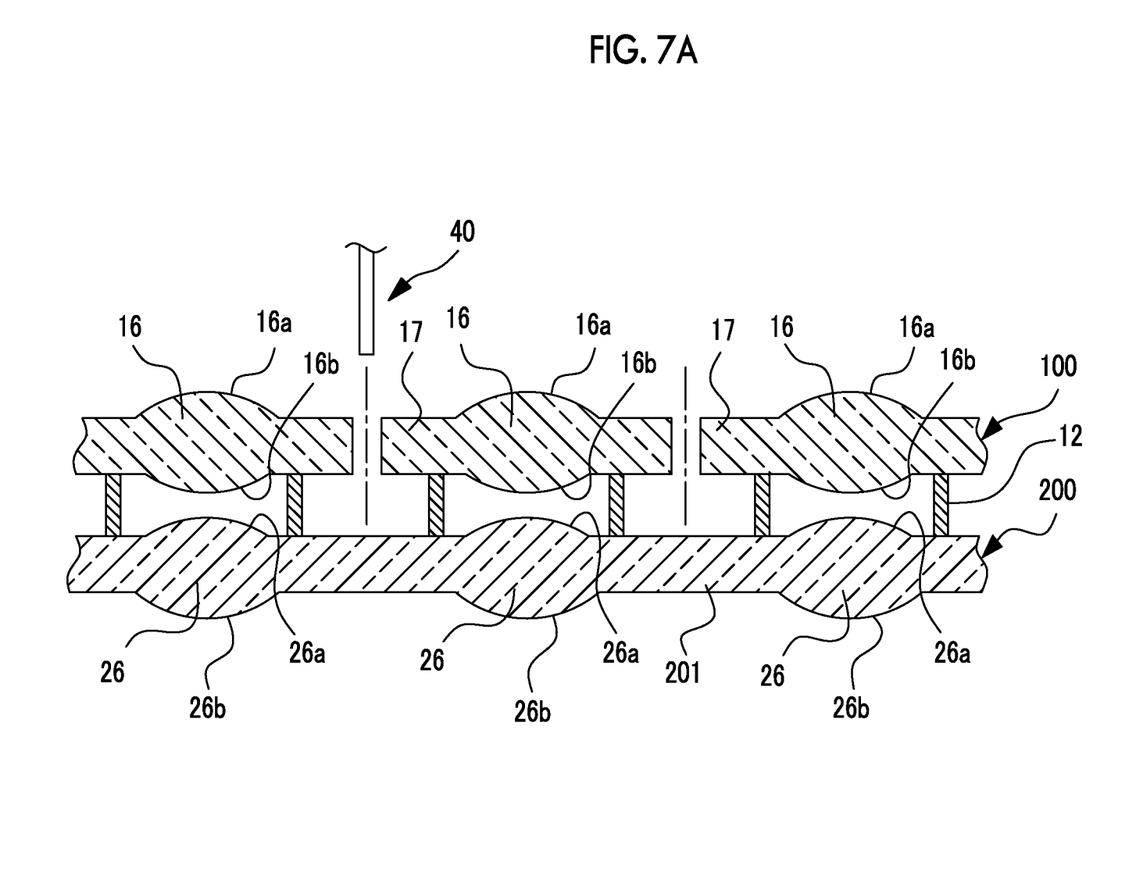
FIGS. 7A to 7C are schematic cross-sectional views which describe processes for manufacturing a lens module from the two lens arrays shown in FIG. 6.
Figure 7B:
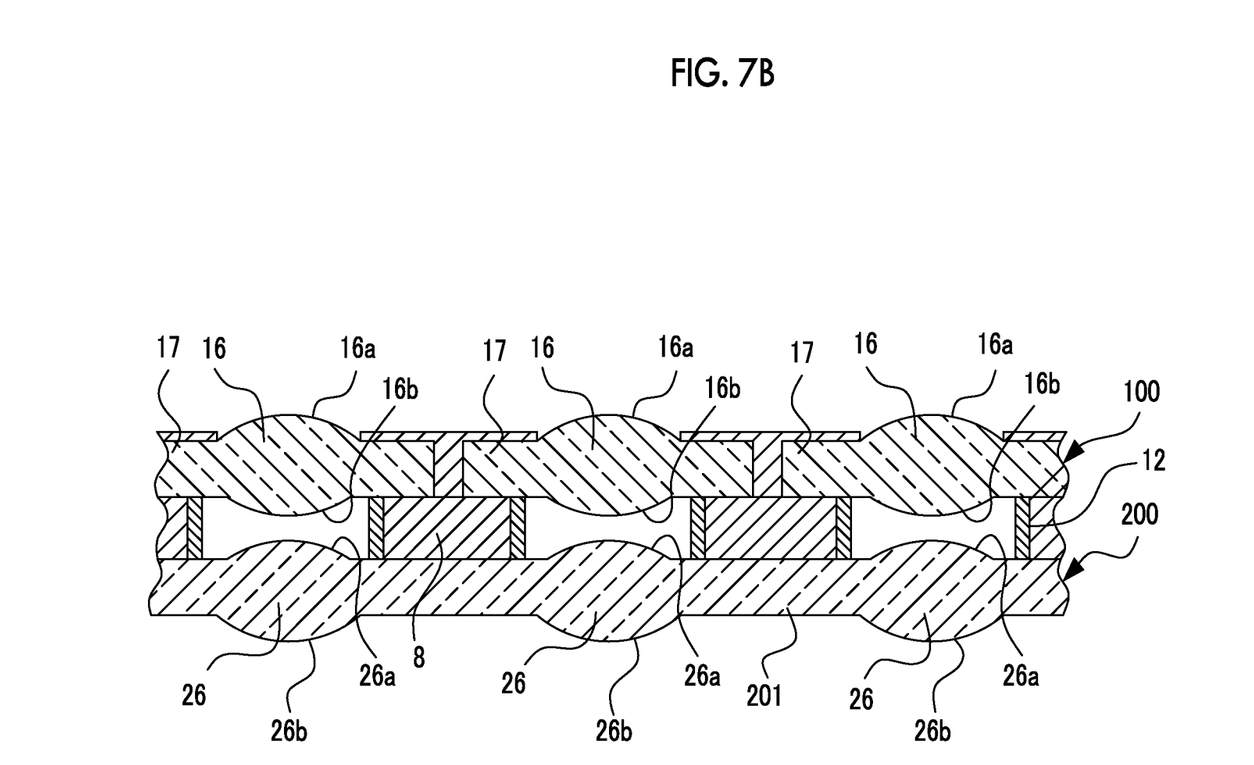
Figure 7C:
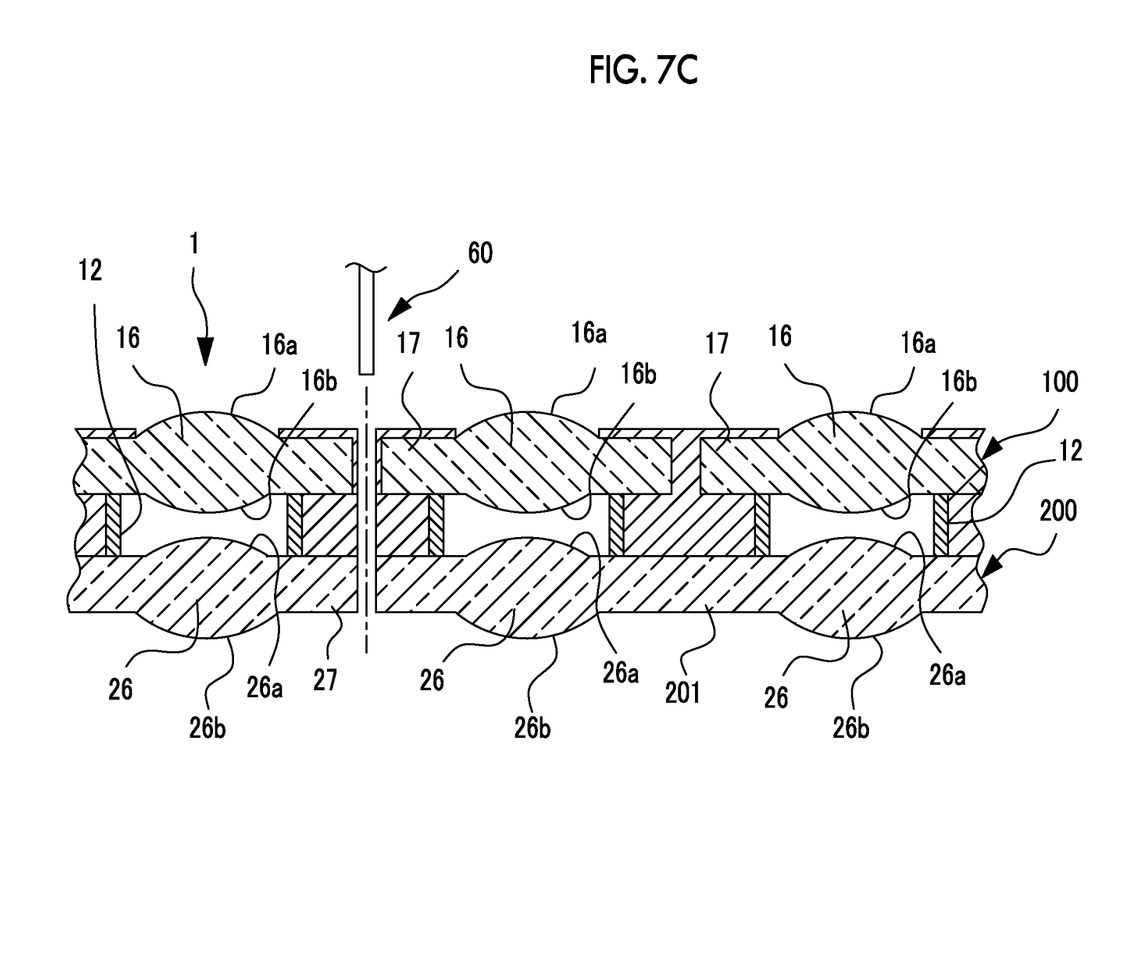

FIGS. 7A to 7C are schematic cross-sectional views which describe processes for manufacturing a lens module.

The substrate portion 101 of the lens array 100 is cut by a cutting edge 40 (a first cutting portion) of a dicing blade or the like, as shown in FIG. 7A. The cut substrate portion 101 attached to the lens portion 16 is the flange portion 17. In this case, the substrate portion 101 is cut in a lattice-shape when the lens array 100 is seen in plan view. Furthermore, only the substrate portion 101 is cut and the substrate portion 201 of the lens array 200 is not cut.

Subsequently, thermosetting resins to constitute the holding portion 8 are supplied to a gap between the lens array 100 and the lens array 200 from a gap between cut surfaces in the substrate portion 101 of the lens array 100, as shown in FIG. 7B. Supplying of thermosetting resins is performed by applying the thermosetting resins using a dispenser or the like so as to control the feed rate thereof.

Since the supplied thermosetting resins are blocked by the adhering portion 12, it is possible to prevent the thermosetting resins from adhering to the lens surfaces 16b and 26a. In this way, the thermosetting resins are filled in a space which is surrounded by an upper surface of the substrate portion 201 of the lens array 200, the adhering portion 12 and the substrate portion 101. In addition, the thermosetting resins are supplied so as to cover a surface (a surface of the cut substrate portion 101) of the flange portion 17 and a cut surface thereof.

After supplying the thermosetting resins, a heating treatment is performed on the thermosetting resins by heating means (not shown). Thereby, the thermosetting resins are cured.

After curing the thermosetting resins, the substrate portion 201 of the lens array 200 is cut by a cutting edge 60 (a second cutting portion) such as a dicing blade, as shown in FIG. 7C. Thereby, each lens module is separated in a state of including one lens portion 16 and one lens portion 26. In this way, it is possible to produce the lens module 1 which includes the holding portion 8 formed of thermosetting resins.

In this case, it is preferable that the thickness of the cutting edge 60 for cutting the substrate portion 201 be thinner than that of the cutting edge 40 for cutting the substrate portion 101. According to the configuration described above, it is possible to prevent the thermosetting resins filled in the space between the cut surfaces of the substrate portion 101 from being removed by the cutting edge 60 when cutting the substrate portion 201.

According to the method for manufacturing a lens module, it is possible to produce a lens module of which the first lens L1 and the second lens L2 are firmly fixed to each other by the holding portion 8. Therefore, it is possible to cause the holding portion 8 to suppress a generation of a gap between the substrate portions of the lens module or a positional deviation of an optical axis of a lens portion thereof, during a reflow process after mounting the lens module on an imaging unit. Thus, it is possible to suppress the deterioration of the optical properties of the lens module.

In addition, the holding portion 8 is integrally formed not only over the gap between the flange portion 17 of the first lens L1 and the flange portion 27 of the second lens L2 but also on the surface and the cut surface of the flange portion 17 of the first lens L1. Therefore, upon comparison with the configuration of the related art in which a holding portion adheres only to the gap between the superimposed lenses, it is possible to more securely hold each of the lenses L1 and L2.

Next, a configurational-modification example of the lens module of the present invention will be described.

A lens module may include three or more lenses. According to a method for manufacturing such a lens module, it is possible to produce a lens module by bringing a plurality of lens arrays to be superimposed on each other in a state of interposing an adhering portion therebetween and then separating the superimposed lens arrays, as described above. Thermosetting resins may be supplied in accordance with the following procedure. First, substrate portions of a plurality of lens arrays, except the lowermost lens array, are cut by a cutting edge, as described above. In this case, only the lowermost lens array functions as a base. Then, thermosetting resins are supplied from a gap between cut surfaces. Subsequently, the thermosetting resins are cured, and the lens array functioning as a base is cut.

Materials having a light blocking effect can be adopted as the thermosetting resins constituting the holding portion 8. In this case, it is unnecessary for a lens module or an imaging unit including the lens module to be additionally provided with a light blocking member.

Materials having a heat resistance property, such as materials having a heat resistance property of 270° C. can be adopted as thermosetting resins constituting the holding portion 8. In this case, a holding force of the holding portion 8 of the lens module is prevented from being deteriorated during a reflow process or the like, and therefore it is possible to more securely hold the lens.

In at least a lens array of superimposed lens arrays, a concave and convex portion may be provided on a surface of a substrate portion thereof so as to expand the contact area between the substrate portion and thermosetting resins to be supplied. The concave and convex portion can be formed on the surface of the substrate portion 101 by a mold, during a lens array molding process. A lens module is manufactured using the obtained lens array in accordance with the procedure shown in FIGS. 7A to 7C. Therefore, it is possible to produce a lens module having a configuration shown in FIG. 8.

Figure 8:
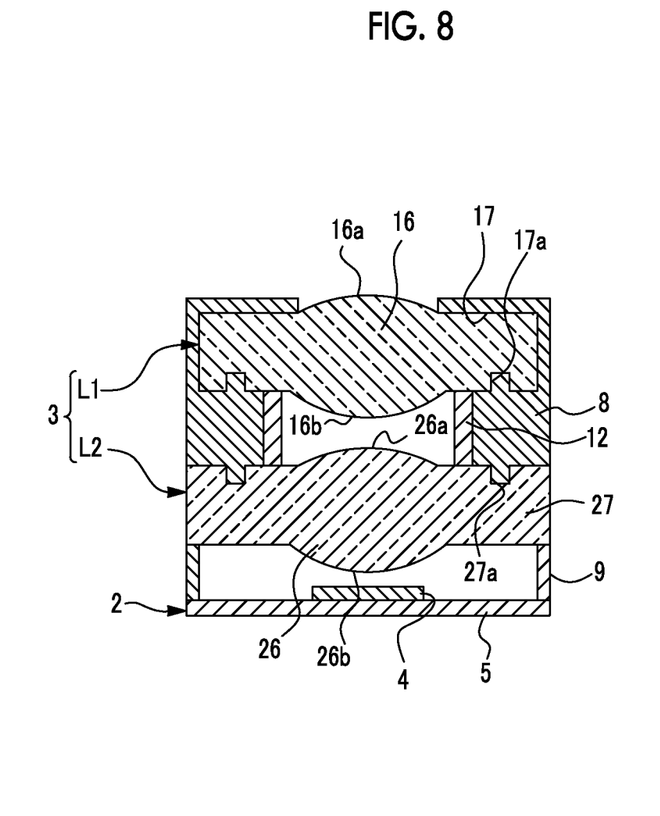
FIG. 8 is a view showing a configurational modification example of the lens module.

In the lens module 3 shown in FIG. 8, a concave portion 17a is formed on the flange portion 17 which is formed by cutting the substrate portion of the lens array. In addition, a concave portion 27a is formed on the flange portion 27. If the lens module 3 has a configuration enabling the contact area between the flange portions 17 and 27 and the holding portion 8 to be expanded, it is possible to more securely hold the lenses L1 and L2 by the holding portion 8.

The configuration enabling the contact area between the flange portions 17 and 27 and the holding portion 8 to be expanded is not limited to a concave and convex shape shown in FIG. 8, and may have a wavy cross-sectional surface. Alternatively, a fine concave and convex pattern may be formed on the surfaces of the flange portions 17 and 27.

In a process shown in FIG. 7A, a cutting edge having a large abrasive grain may be adopted as a cutting edge for cutting the substrate portion 101 such that a cut surface of the substrate portion has a rough surface. In this way, it is possible to increase an adhesion force of the rough surface and the supplied thermosetting resins.

The present application discloses the following contents.

(1) A method for manufacturing a lens module in which a plurality of lenses are held in a state where an optical axis of each lens is aligned, includes: superimposing a plurality of lens arrays, each of which has the plurality of lens portions and a substrate portion integrally connecting the plurality of lens portions, on each other at predetermined intervals, and aligning optical axes of the lens portions of the superimposed lens arrays; cutting the substrate portions of the other lens arrays of the plurality of superimposed lens arrays except the lowermost lens array in a superimposing direction by a first cutting portion; supplying thermosetting resins from a gap between cut surfaces of the cut substrate portion so as to fill a gap between the substrate portions of the superimposed lens arrays with the thermosetting resins and to cause the thermosetting resins to integrally cover the cut surface of the substrate portion and a surface of the substrate portion of the uppermost lens array in the superimposing direction of the plurality of superimposed lens arrays; curing the thermosetting resins by supplying heat; and separating an individual lens module by cutting the substrate portion of the lowermost lens array in the superimposing direction of the plurality of superimposed lens arrays using a second cutting portion.

(2) The method for manufacturing a lens module according to (1), wherein a concave and convex portion is provided on a surface of the substrate portion of at least a lens array of the superimposed lens arrays so as to expand the contact area between the substrate portion and the thermosetting resins to be supplied.

(3) The method for manufacturing a lens module according to (1) or (2) in which a rough surface is formed on the cut surface of the substrate portion when the substrate portion is cut by the first cutting portion.

(4) The method for manufacturing a lens module according to any one of (1) to (3) in which the plurality of superimposed lens arrays are adhered to each other by an adhering portion when the plurality of lens arrays are superimposed on each other.

(5) The method for manufacturing a lens module according to (4), wherein the adhering portion is formed at a periphery of the lens portion, and thereby the lens portion is partitioned from the thermosetting resins to be supplied.

(6) The method for manufacturing a lens module according to (4) or (5), wherein the adhering portion is formed of ultraviolet curable resins, and the superimposed lens arrays are fixed to each other by curing the ultraviolet curable resins prior to cutting the substrate portion.

(7) The method for manufacturing a lens module according to any one of (1) to (6) in which the first cutting portion and the second cutting portion each include a cutting edge, and the thickness of the cutting edge of the second cutting portion is thinner than that of the first cutting portion.

(8) The method for manufacturing a lens module according to any one of (1) to (7) in which the thermosetting resins are materials having a heat resistance property.

(9) The method for manufacturing a lens module according to any one of (1) to (8) in which the thermosetting resins are materials having a light blocking effect.

(10) A lens module which is manufactured by the method for manufacturing a lens module according to any one of (1) to (9).

What is claimed is:

1. A method for manufacturing a lens module in which a plurality of lenses are held in a state where an optical axis of each lens is aligned, comprising:

superimposing a plurality of lens arrays, each of which has the plurality of lens portions and a substrate portion integrally connecting the plurality of lens portions, on each other at predetermined intervals, and aligning optical axes of the lens portions of the superimposed lens arrays;

cutting the substrate portions of the other lens arrays of the plurality of superimposed lens arrays except the lowermost lens array in a superimposing direction by a first cutting portion;

supplying thermosetting resins from a gap between cut surfaces of the cut substrate portion so as to fill a gap between the substrate portions of the superimposed lens arrays with the thermosetting resins and to cause the thermosetting resins to integrally cover the cut surfaces of the substrate portion and a surface of the substrate portion of the uppermost lens array in the superimposing direction of the plurality of superimposed lens arrays;

curing the thermosetting resins by supplying heat; and separating an individual lens module by cutting the substrate portion of the lowermost lens array using a second cutting portion.

2. The method for manufacturing a lens module according to claim 1,
wherein a concave and convex portion is provided on a surface of the substrate portion of at least a lens array of the superimposed lens arrays so as to expand the contact area between the substrate portion and the thermosetting resins to be supplied.

3. The method for manufacturing a lens module according to claim 2,
wherein a rough surface is formed on the cut surface of the substrate portion when the substrate portion is cut by the first cutting portion.

4. The method for manufacturing a lens module according to claim 3,
wherein the plurality of superimposed lens arrays are adhered to each other by an adhering portion when the plurality of lens arrays are superimposed on each other.

5. The method for manufacturing a lens module according to claim 2,
wherein the plurality of superimposed lens arrays are adhered to each other by an adhering portion when the plurality of lens arrays are superimposed on each other.

6. The method for manufacturing a lens module according to claim 2,
wherein the first cutting portion and the second cutting portion each include a cutting edge, and the thickness of the cutting edge of the second cutting portion is thinner than that of the first cutting portion.

7. The method for manufacturing a lens module according to claim 2,
wherein the thermosetting resins are materials having a heat resistance property.

8. The method for manufacturing a lens module according to claim 2,
wherein the thermosetting resins are materials having a light blocking effect.

9. A lens module which is manufactured by the method for manufacturing a lens module according to claim 2.

10. The method for manufacturing a lens module according to claim 1,
wherein a rough surface is formed on the cut surface of the substrate portion when the substrate portion is cut by the first cutting portion.

11. The method for manufacturing a lens module according to claim 10,
wherein the plurality of superimposed lens arrays are adhered to each other by an adhering portion when the plurality of lens arrays are superimposed on each other.

12. The method for manufacturing a lens module according to claim 1,
wherein the plurality of superimposed lens arrays are adhered to each other by an adhering portion when the plurality of lens arrays are superimposed on each other.

13. The method for manufacturing a lens module according to claim 12,
wherein the adhering portion is formed at a periphery of the lens portion, and thereby the lens portion is partitioned from the thermosetting resins to be supplied.

14. The method for manufacturing a lens module according to claim 13,
wherein the adhering portion is formed of ultraviolet curable resins, and the superimposed lens arrays are fixed to each other by curing the ultraviolet curable resins prior to cutting the substrate portion.

15. The method for manufacturing a lens module according to claim 12,
wherein the adhering portion is formed of ultraviolet curable resins, and the superimposed lens arrays are fixed to each other by curing the ultraviolet curable resins prior to cutting the substrate portion.

16. The method for manufacturing a lens module according to claim 1,
wherein the first cutting portion and the second cutting portion each include a cutting edge, and the thickness of the cutting edge of the second cutting portion is thinner than that of the first cutting portion.

17. The method for manufacturing a lens module according to claim 1,
wherein the thermosetting resins are materials having a heat resistance property.

18. The method for manufacturing a lens module according to claim 1,
wherein the thermosetting resins are materials having a light blocking effect.

19. A lens module which is manufactured by the method for manufacturing a lens module according to claim 1.

20. An imaging unit comprising:
a sensor module having a solid-state imaging device and a sensor substrate portion; and
the lens module according to claim 19.

* * * * *